Jan. 7, 1941.　　　H. E. GRILL ET AL　　　2,227,897
CRYSTALLIZING APPARATUS

Filed Sept. 11, 1939　　　2 Sheets-Sheet 1

INVENTORS.
HARRY E. GRILL
HENRY H. FELDSTEIN
BY Hull, Brock & West.
ATTORNEYS.

Jan. 7, 1941. H. E. GRILL ET AL 2,227,897
CRYSTALLIZING APPARATUS
Filed Sept. 11, 1939  2 Sheets-Sheet 2

INVENTORS.
HARRY E. GRILL
HENRY H. FELDSTEIN.
BY Hull, Brock & West
ATTORNEYS.

Patented Jan. 7, 1941

2,227,897

UNITED STATES PATENT OFFICE 2,227,897

CRYSTALLIZING APPARATUS

Harry E. Grill, Willoughby, and Henry H. Feldstein, Cleveland, Ohio, assignors to The Kilby Manufacturing Company, Cleveland, Ohio, a corporation of Ohio Application September 11, 1939, Serial No. 294,284

3 Claims. (Cl. 127—15)

Figure 1:
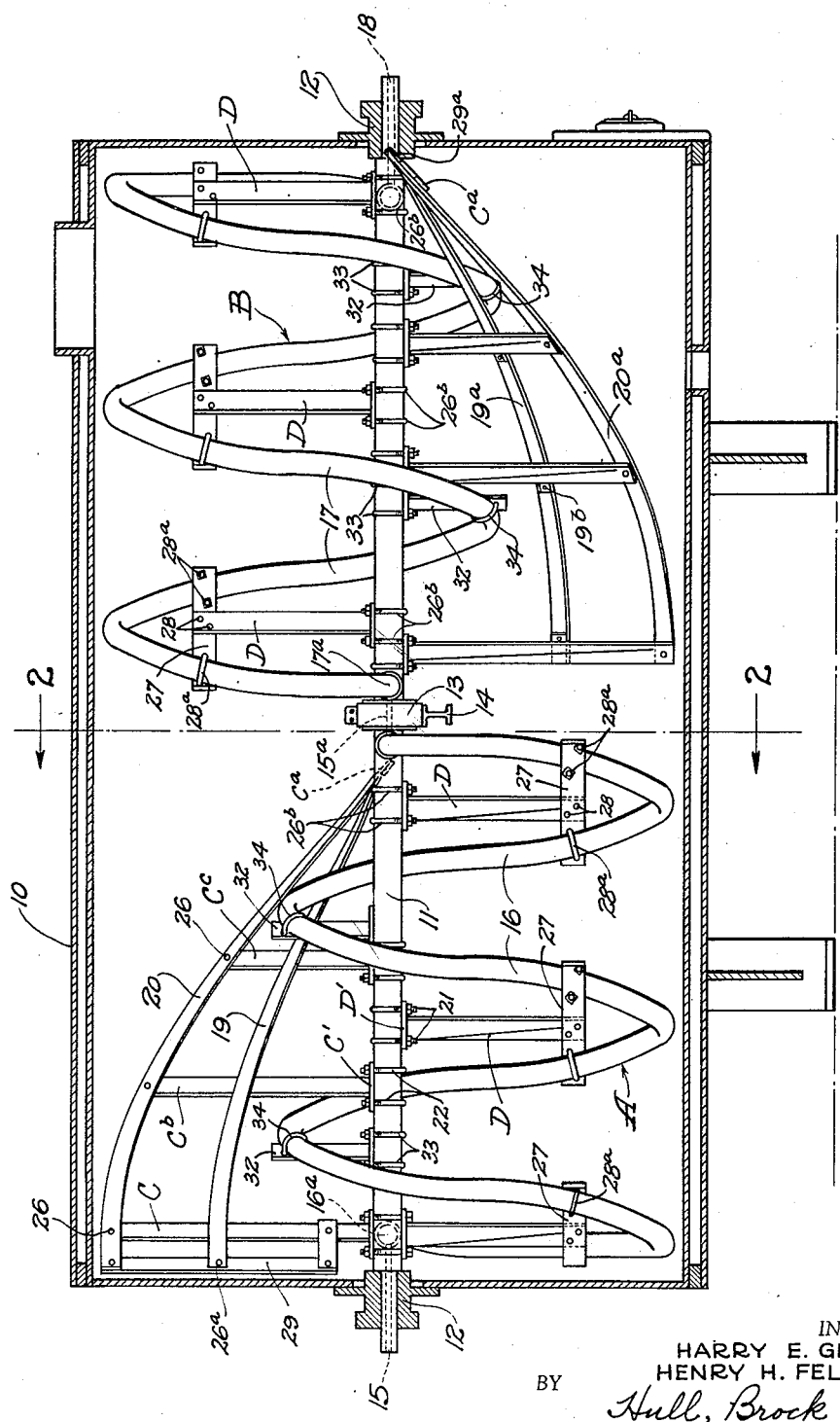
Figure 2:
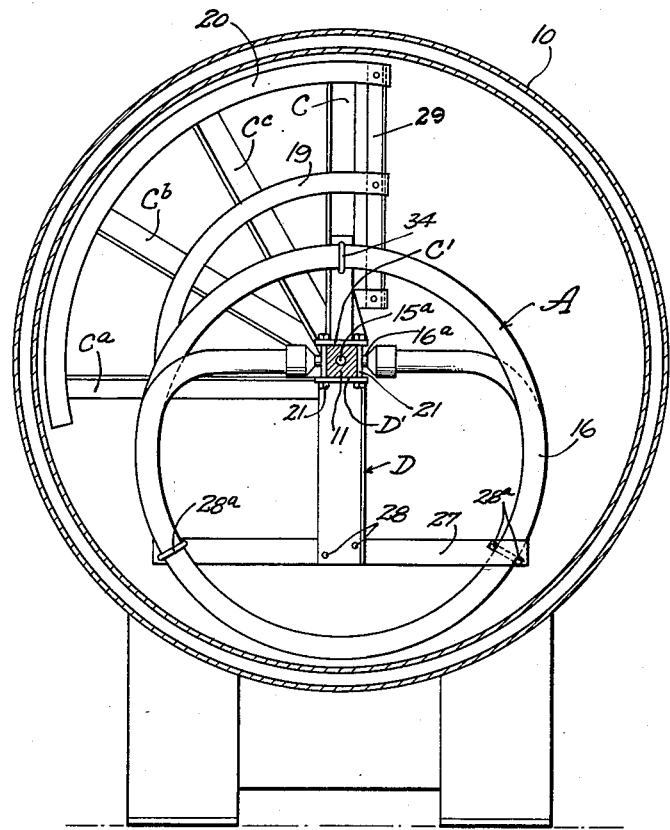
Figure 3:
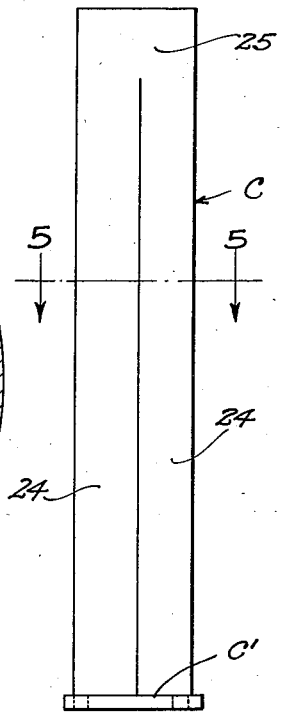
Figures 6, 7, 8, 9:
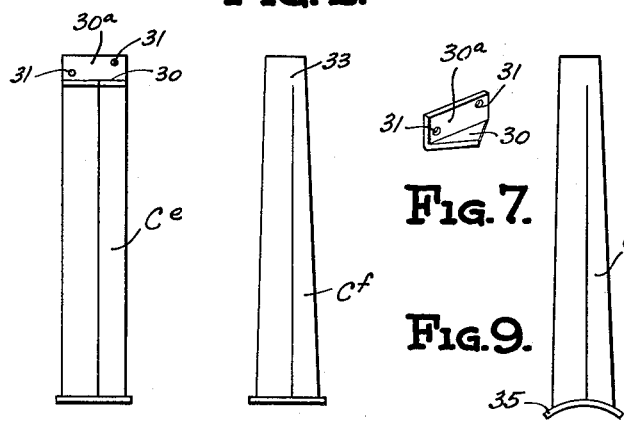

This invention relates to apparatus for effecting crystallization of sugar from the mother liquid or massecuite and has for its general object to improve the efficiency of such apparatus. More specifically, our invention relates to the construction of the arms and braces by which convolutions of the coils and the helical stirrers are supported from the shafts of such apparatus and to the cooperating features of the arms, the braces, the coils, and the stirrers whereby the improvements in efficiency are obtained. The means whereby these improvements are obtained will be explained in connection with the detailed description of the embodiments of our invention shown in the drawings forming part hereof, wherein Fig. 1 represents a central longitudinal sectional view through a crystallizing tank having our invention therein, the coils, the shaft, the inner stirrers and the outer combined stirrers and scrapers being shown in elevation; Fig. 2 a detail in section taken on the line 2—2 of Fig. 1; Fig. 3 a side elevation, Fig. 4 a top plan view and Fig. 5 a detail in section of one of the supporting arms shown in the preceding views, the sectional detail being taken on the line 5—5 of Fig. 3; Fig. 6 a view similar to Fig. 3, of a modified form of arm and Fig. 7 a detail in perspective of a portion of the outer end of said arm; Fig. 8 a side elevation of a further modified form of supporting arm; and Fig. 9 a side elevation of one of our arms showing the same equipped with a base adapted to fit upon and be secured to a shaft circular in section.

Describing the various parts herein by reference characters and in connection with Figs. 1–7 inclusive, 10 denotes a crystallizer tank, preferably circular in cross section; 11 denotes a shaft mounted in journal boxes 12 in the heads of the tank and driven by ordinary means (not shown). 13 denotes a central bearing for the shaft, said bearing being carried by a support 14 which extends transversely of the tank and is secured at its opposite ends to the inner wall thereof. The shaft is provided with an inlet channel 15 at one end, said channel forming part of the conduit by means of which water is supplied to and through the sections of the coil, which in turn are secured to and communicate with the interior of the shaft, within the tank.

Two helical coil sections of opposite eccentricity are shown at A and B, each section comprising a plurality of convolutions 16, 17 respectively, the centers of the convolutions of one coil section being diametrically opposed to the centers of the convolutions of the other coil section. The receiving end of the coil section A communicates with the channel 15, as indicated at 16ª, while the delivery end of said coil section communicates with a channel 15ª in the bearing 13, the delivery end of the channel 15ª communicating in turn with the receiving end 17ª of the coil section 17. The delivery end of this coil section communicates in turn with the delivery channel 18 in the end of the shaft on which the said coil section is mounted. It will be noted that the portions of the convolutions of the coil sections A and B which are more remote from the shaft extend in close proximity to the inner wall of the tank while the opposite portions of the convolutions are in close proximity to the shaft.

19 and 19ª denote inner helical stirrers and 20 and 20ª outer helical combined stirrers and scrapers. In the crystallizer shown herein, each inner helical stirrer and associated combined helical stirrer and scraper has a coarse pitch amounting to about one quarter turn and the ends of the elements 20 and 20ª which are adjacent to the ends of the elements 19 and 19ª are spaced 90° apart. The manner in which the stirrers and scrapers and the convolutions of the coil sections, as shown herein, are supported will now be described.

The supporting arms

Each of the arms which is used as a means for supporting the helical stirrers and the helical combined stirrers and scrapers and the portions of the convolutions of the coils which are most remote from the shaft comprises generally a base plate and means for securing the same to the shaft, each of the arms proper, indicated at C and D, being of the blade type and being also specifically triangular in section. As the shaft shown herein is square in section, the base plates C' and D' for the arms C and D are flat and are connected to the receiving and delivery ends of the shaft in any approved manner, as by bolts 21.

It will be noted that the inner helical stirrer 19 and the outer combined helical stirrer and scraper 20 are supported by four arms which are arranged 30 degrees apart; also that the same number and spacing of arms are employed for the support of the inner helical stirrer 19ª and the outer combined helical stirrer and scraper 20ª. The means for securing the inner helical stirrers to the arms which are also secured to the outer combined helical stirrers and scrapers are indicated at 19ᵇ on the right hand of Fig. 1. Cª denotes the arm in each section of the crystallizer which is arranged 90 degrees from the arm C, while the intermediate arms are indicated at $C^b$ and $C^c$. The arms C and $C^a$ project at right angles from their respective base plates, which are shown as secured to the adjacent surfaces of the square shaft by bolts 21. The intermediate arms $C^b$ and $C^c$ each projects at an angle with respect to its base plate whereby the base plate of the arm $C^b$ may be conveniently secured, as by U-bolts 22, to the same side of the shaft as the base plate of the arm $C^a$, while the base plate of the arm $C^c$ may be secured to the same surface of the shaft to which the base plate of the arm C is secured.

Each of the forms of the arms which we employ is triangular in cross section. The preferred form of the arms is that shown in Figs. 3–5, wherein C denotes the arm generally, the same having a flat base 23 of the same width throughout its length while 24 denotes the sides of the arm, these sides being preferably of equal width and the depth of the arm, or the distance between the intersection of the sides 24 and the base 23, diminishing gradually from the base plate C' to the outer end of the arm, where the sides merge into a single flat plate which reinforces the base at this point, as will be seen at 25. It will be noted that the arms C—$C^c$ are so mounted on their respective base plates that the widened or extended bases 23 of these arms are in the planes of the portions of the inner stirrer and outer combined stirrer and scraper with which they are respectively connected, as by bolts or rivets, indicated at 26, $26^a$. In other words, the arms are so mounted upon the shaft that their widened bases have the same pitch as the stirrers and the combined stirrers and scrapers with which they are respectively connected and with which they cooperate in moving the massecuite longitudinally of the tank.

What we refer to as the base of each of the arms is of considerably greater width than that of either of the sides of the same; and the angle which these sides makes with each other is an obtuse angle of large magnitude whereby the arms will not only afford material assistance to the stirrers and combined stirrers and scrapers in effecting a movement of the massecuite longitudinally of the tank, but the resistance of the sides to the movement of the arms through the massecuite will be reduced to a practical minimum.

The arms D are of the same triangular shape as are the arms C—$C^c$ and have their base plates secured to the shaft, as by means of U-bolts $26^b$. These arms project midway between the branches of the elongated portion of each convolution and are each connected to said branches through bars 27, being secured to the latter, as by means of bolts or rivets 28, while the ends of the bars are connected to the branches as by U-bolts $28^a$. By reference to Figs. 1 and 2 it will be seen that the bars 27 are connected to the opposite branches of their respective convolutions in such manner as to enable the said bars to assist most effectively in imparting a movement to the massecuite longitudinally of the tank. For convenience of reference, the left hand end of the tank will be considered as the front end and the opposite end as the rear end. It will be noted that the bars 27 are shown as connected to the convolutions A by the U-bolts $28^a$ in such manner that the left hand end of each bar is at the minimum possible distance from the front of the tank while the right hand end of the bar is at the maximum possible distance from the front of the tank. This means that, as the shaft and the coil are rotated, the bars 27 will, for a given length thereof, exercise a maximum impelling force to the massecuite in a direction longitudinally of the tank.

The ends of the inner stirrer and of the combined outer stirrer and scraper which are adjacent to the respective heads of the cylinders are preferably secured to extension brackets 29, $29^a$, which are supported at their inner ends from the arms C and serve to scrape sugar crystals from the heads.

From the foregoing it will be seen that there is an essential cooperation between the arms C—$C^c$, the stirrers 19, $19^a$, the combined stirrers and scrapers 20 and $20^a$, the arms D, the bars 27 and the convolutions of the coil in effecting a circulation of the massecuite longitudinally of the tank. Furthermore, owing to the shape of the arms C—$C^c$ and D, there will be no accumulation of sugar thereon.

Figure 4:
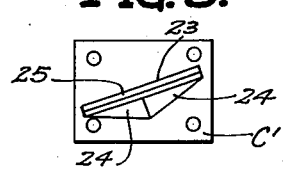
Figure 5:
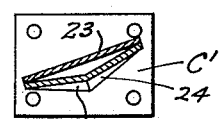

While, as pointed out hereinbefore, we prefer to make our arms C—$C^c$ and D of the shape shown in Figs. 3–5, we may make the same of uniform cross section throughout their length as indicated in Fig. 6. When the arms $C^e$ are constructed in this manner, their outer ends are secured to the elements 20 by means of angle plates having each a triangular base 30, which covers and closes the outer hollow end of each arm, and a flange $30^a$ which abuts against the extended outer end of the base of the arm and which is provided with apertures 31 registering with apertures in the base, whereby the outer end of each arm (including the flange $30^a$) may be secured to a combined stirrer and scraper. The intermediate portions of the arms may be secured to the elements 19 and $19^a$ as by bolts or rivets, as indicated at $26^a$ in Figs. 1 and 2.

In Fig. 8 there is shown at $C^f$ a further modification of our arm which is triangular in section but which diminishes uniformly in width and depth from the base plate to a point near the extreme outer end, where the sides of the arm merge into a single plate reinforcing the outer end of the base, as indicated at 33.

The portions of each convolution which are nearest the shaft are also supported therefrom by short arms 32 having their inner ends or bases secured to the shaft as by means of U-bolts 33 and their outer ends secured to the adjacent portions of corresponding convolutions as by means of U-bolts 34. These short arms may also be given the same pitch or inclination as the operating surfaces of the arms C—$C^c$ and D whereby they also will contribute to the movement of the massecuite.

In Fig. 9 there is shown an arm $C^g$ which may assume the same shape as any of the arms illustrated in Figs. 3–5, 6 and 8, but which is provided with a base plate 35 adapting the arm to be secured to the outer surface of a shaft which is circular in section. The arm shown in Fig. 9 is in other respects of the same shape as that shown in Fig. 8. The inner surface of the base plate 35 is concentric with the center of the shaft, the radius of curvature being substantially the same as that of the exterior surface of the shaft whereby it may be fitted closely thereagainst. All of the arms shown herein are so secured to the shaft that their longitudinal center lines, if extended, will intersect the center of the shaft.

It will be evident that various changes may be made in minor details of construction, such, for instance, as the omission of the center bearing 13, where unnecessary, the particular means employed for securing the various parts together, and the pitch which may be given to the inner helical stirrers and to the outer combined helical stirrers and scrapers. These changes, however, are not believed to avoid the spirit of our invention as defined by the claims herein.

Having thus described our invention, what we claim is:

1. The combination, with a cylindrical crystallizer comprising a tank, a shaft mounted for rotation in and extending longitudinally through said tank, a helical coil of tubing surrounding said shaft and mounted eccentrically thereof, combined helical scrapers and stirrers on opposite sides of said shaft and each having a pitch which will impart a movement to the massecuite longitudinally of the tank, of arms secured to the said shaft and extending substantially radially therefrom and substantially midway between the branches of the elongated portion of each convolution of the coil, each of said arms being triangular in section, the plane of the base of the triangular portion of each arm forming an acute angle, from the front to the rear thereof, with a plane perpendicular to the axis of the shaft, and a bar secured to the outer end of each of said arms and to the branches of the said elongated portions of the convolutions, the angularity of the base of each arm and that of the bar connecting each arm with the branches of the convolutions being such as to cooperate with the combined stirrer and scraper in imparting a movement of the massecuite longitudinally of the tank.

2. In the combination set forth in claim 1, additional radially extending and angularly spaced arms secured to the shaft, each of the last mentioned arms being also triangular in section with the bases of their triangular portions having substantially the same pitch as the pitch of the combined helical scrapers and stirrers, and means for securing the outer ends of the last mentioned arms to the combined scrapers and stirrers.

3. In the combination set forth in claim 1, a helical stirrer on opposite sides of said shaft and each interposed between the shaft and a combined helical scraper and stirrer and each having the same pitch as the combined helical scrapers and stirrers, additional radially extending and angularly spaced arms secured to the shaft, each of the last mentioned arms being also triangular in section and the bases of their triangular portions having substantially the same pitch as the pitch of the combined helical scrapers and stirrers and of the interposed helical stirrers, means for securing the outer ends of the last mentioned arms to the combined helical scrapers and stirrers, and means for securing the intermediate portions of said arms to the helical stirrers.

HARRY E. GRILL.
HENRY H. FELDSTEIN.